US012585061B2

(12) United States Patent
Lin et al.

(10) Patent No.: US 12,585,061 B2
(45) Date of Patent: Mar. 24, 2026

(54) LIGHT-EMITTING MODULE

(71) Applicant: Chicony Power Technology Co., Ltd., New Taipei City (TW)

(72) Inventors: Chun-Ting Lin, New Taipei City (TW); Chen-Hao Chiu, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 310 days.

(21) Appl. No.: 18/403,156

(22) Filed: Jan. 3, 2024

(65) Prior Publication Data

US 2025/0110268 A1 Apr. 3, 2025

(30) Foreign Application Priority Data

Sep. 28, 2023 (TW) .................................. 112137562

(51) Int. Cl.
*F21V 8/00* (2006.01)
(52) U.S. Cl.
CPC .......... *G02B 6/0091* (2013.01); *G02B 6/0011* (2013.01); *G02B 6/0046* (2013.01); *G02B 6/0068* (2013.01); *G02B 6/0073* (2013.01); *G02B 6/0081* (2013.01); *G02B 6/009* (2013.01)
(58) Field of Classification Search
CPC ... G02B 6/0011; G02B 6/0081; G02B 6/0091
See application file for complete search history.

(56) References Cited

U.S. PATENT DOCUMENTS

| | | | |
|---|---|---|---|
| 8,061,882 B2 | 11/2011 | Bita et al. | |
| 2010/0118563 A1 | 5/2010 | Shen et al. | |
| 2012/0081922 A1* | 4/2012 | Yeh | G02B 6/0073 |
| | | | 362/612 |
| 2015/0070931 A1 | 3/2015 | Lin | |
| 2017/0192148 A1* | 7/2017 | Shang | G02B 6/0088 |

FOREIGN PATENT DOCUMENTS

| | | | |
|---|---|---|---|
| CN | 110068884 A | | 7/2019 |
| CN | 212782630 | | 3/2021 |
| CN | 212966206 U | * | 4/2021 |
| CN | 113108245 | | 7/2021 |
| CN | 215637066 | | 1/2022 |
| CN | 114077093 A | | 2/2022 |

(Continued)

*Primary Examiner* — Michael Stahl
(74) *Attorney, Agent, or Firm* — Birch, Stewart, Kolasch & Birch, LLP

(57) ABSTRACT

A light-emitting module includes a light guide member, a first reflective paint layer, a first light-absorbing paint layer, a circuit board, and a light-emitting unit. The light guide member includes a positioning surface, a first side surface, a second side surface, and a light emergence surface. The positioning surface includes a groove. The first reflective paint layer is arranged on the first side surface, and the first light-absorbing paint layer is arranged on the first reflective paint layer. The circuit board is located on the positioning surface. The light-emitting unit is arranged on the circuit board and is accommodated in the groove. In this way, the light-emitting unit on the circuit board may change a light path and project light to the light emergence surface, thereby reducing a required stack thickness of the light-emitting module.

21 Claims, 11 Drawing Sheets

(56)         References Cited

FOREIGN PATENT DOCUMENTS

| | | | |
|---|---|---|---|
| CN | 114460776 | A | 5/2022 |
| EP | 2733414 | A2 * | 5/2014 |
| TW | I336799 | | 2/2011 |
| TW | I438382 | | 5/2014 |
| TW | 202020364 | A | 6/2020 |
| TW | M622225 | | 1/2022 |

* cited by examiner

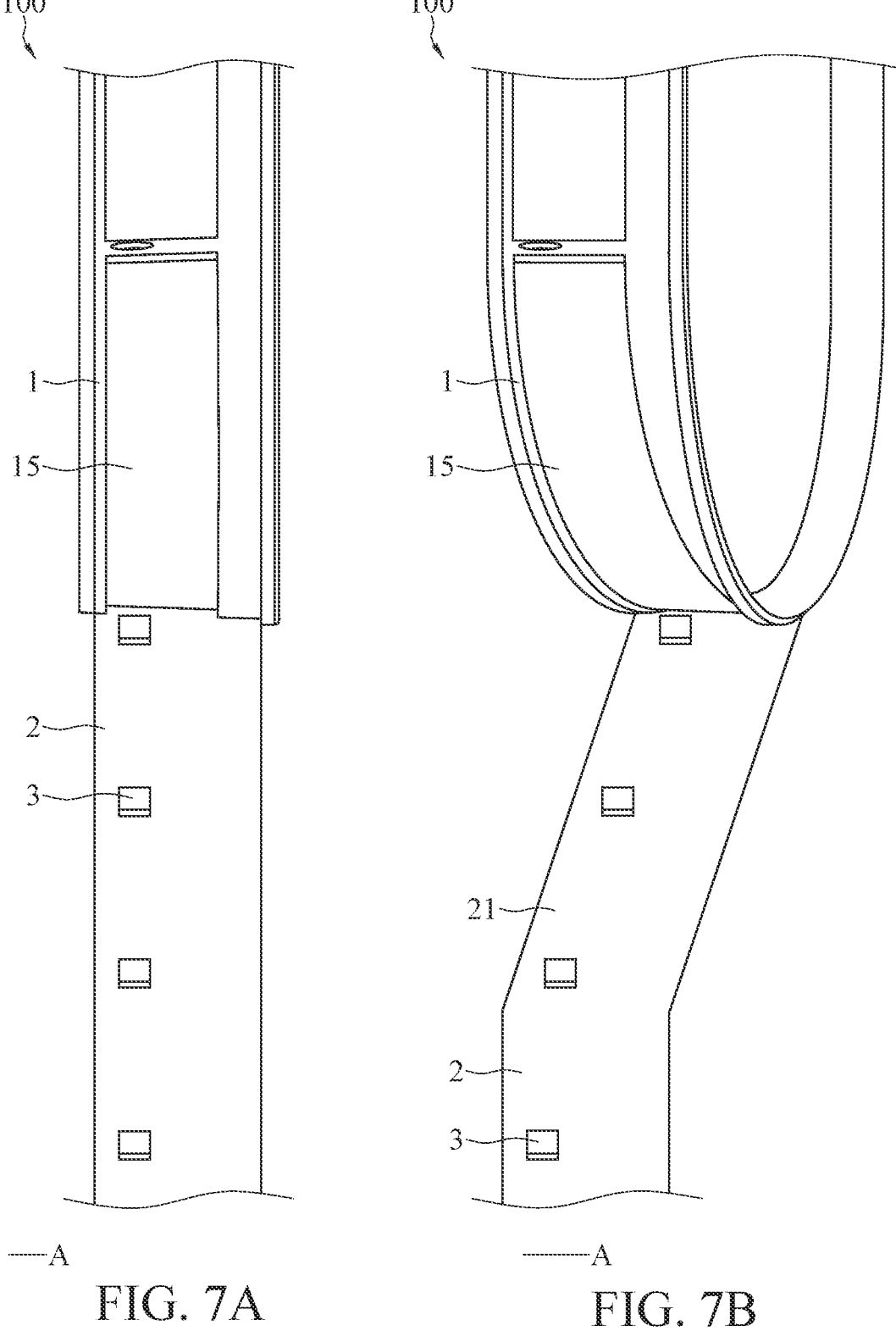
FIG. 7A                    FIG. 7B

100

1

15

3   2

100

1

15

3   3   3   2

LIGHT-EMITTING MODULE

CROSS-REFERENCE TO RELATED APPLICATION

This non-provisional application claims priority under 35 U.S.C. § 119(a) to patent application No. 112137562 filed in Taiwan, R.O.C. on Sep. 28, 2023, the entire contents of which are hereby incorporated by reference.

BACKGROUND

Technical Field

The present invention relates to a light-emitting module, and in particular, to a light-emitting module including a reflective paint layer and a light-absorbing paint layer.

Related Art

Light-emitting modules are widely used in various products, so that the products have a special illuminant visual effect. An existing light-emitting module includes a light guide member, an optical fiber, a support base, and a support. The optical fiber needs to be fixed and arranged behind the light guide member through the support base, and two ends of the optical fiber needs to be fixedly combined with the optical fiber and a light source through the support. In this case, the light-emitting module requires a mechanism thickness of at least 3.0 millimeters (mm).

SUMMARY

In order to achieve a uniform light effect and effectively eliminate hotspots, a vertical distance from a light-emitting surface of a light-emitting diode (LED) to a light emergence surface of a light guide member needs to be at least 6.0 mm, or a diffusant or diffusion powder with a high concentration ratio is added to assist in diffusion and diluting the hotspots.

In view of the above, in some embodiments, a light-emitting module includes a light guide member, a first reflective paint layer, a first light-absorbing paint layer, a circuit board, and a light-emitting unit. The light guide member includes a positioning surface, a first side surface, a second side surface, and a light emergence surface. The positioning surface includes a groove. The positioning surface is connected to the second side surface and the light emergence surface, the second side surface is connected to the first side surface, and the first side surface is connected to the light emergence surface. The first reflective paint layer is arranged on the first side surface, and the first light-absorbing paint layer is arranged on the first reflective paint layer. The circuit board is located on the positioning surface. The light-emitting unit is arranged on the circuit board and is accommodated in the groove.

In some embodiments, the light-emitting module further includes a second reflective paint layer and a second light-absorbing paint layer. The second reflective paint layer is arranged on the second side surface. The second light-absorbing paint layer is arranged on the second reflective paint layer.

In some embodiments, the light-emitting module further includes a third reflective paint layer arranged on an inner side surface of the circuit board.

In some embodiments, the light-emitting module further includes a fourth reflective paint layer and a third light-absorbing paint layer. The fourth reflective paint layer is arranged on the positioning surface. The third light-absorbing paint layer is arranged on the fourth reflective paint layer.

In some embodiments, two ends of the first side surface respectively include a first end portion and a second end portion, the first end portion is connected to the light emergence surface, and the second end portion is connected to the second side surface. A distance between the first end portion and the positioning surface is less than a distance between the second end portion and the positioning surface.

In some embodiments, an included angle between the first side surface and the second side surface is in a range of 88 degrees to 90 degrees.

In some embodiments, an axial direction perpendicular to the second side surface is a first axial direction, and a width of the groove in the first axial direction is greater than a width of the light-emitting unit in the first axial direction.

In some embodiments, the groove includes an inner side surface, an outer side surface, and a light incident surface. The inner side surface is close to the second side surface, the outer side surface is close to the light emergence surface, and the light incident surface is connected to the inner side surface and the outer side surface. An axial direction perpendicular to the second side surface is a first axial direction. A distance between the light-emitting unit and the outer side surface in the first axial direction is 1.5 to 2 times a width of the light-emitting unit in the first axial direction.

In some embodiments, an axial direction perpendicular to the positioning surface is a second axial direction, and a height of the groove in the second axial direction is greater than a height of the light-emitting unit in the second axial direction.

In some embodiments, an axial direction perpendicular to the second side surface is a first axial direction, a distance between the light-emitting unit and the second side surface in the first axial direction is less than a distance between the light-emitting unit and the light emergence surface in the first axial direction, and a distance between the groove and the second side surface in the first axial direction is less than a distance between the groove and the light emergence surface in the first axial direction.

In some embodiments, the light-emitting module includes a plurality of light-emitting units, and the light-emitting units are equidistantly arranged on the circuit board.

In some embodiments, the positioning surface includes a plurality of grooves and at least one rib, the at least one rib is located between the grooves, a surface of each of the at least one rib is in the same plane as the positioning surface, and the circuit board is located on the surface of the at least one rib.

In some embodiments, two ends of the positioning surface respectively close to the light emergence surface and the second side surface each further include a protruding rib.

In some embodiments, a thickness of the first reflective paint layer is greater than a thickness of the first light-absorbing paint layer.

In some embodiments, an area of the first reflective paint layer is less than or equal to an area of the first light-absorbing paint layer.

In some embodiments, the first side surface includes a first region and a second region, the first region is connected to the light emergence surface and the second region, and the second region is connected to the second side surface. The first reflective paint layer is arranged on the second region, and the first light-absorbing paint layer is arranged on the first region and the second region.

In some embodiments, the light emergence surface includes a vertical light emergence surface and an oblique light emergence surface, the oblique light emergence surface is connected to the vertical light emergence surface and the first side surface, an included angle between the oblique light emergence surface and the vertical light emergence surface is an obtuse angle, and an included angle between the oblique light emergence surface and the first side surface is an obtuse angle.

In some embodiments, an axial direction perpendicular to the positioning surface is a second axial direction, and a projection length of the oblique light emergence surface in the second axial direction is less than a projection length of the vertical light emergence surface in the second axial direction.

In some embodiments, the light guide member further includes a microstructure arranged on the light emergence surface.

In some embodiments, the light guide member is an annular light guide structure, and a side edge of the light guide member has a curved section.

In some embodiments, a light emergence direction of the light-emitting unit is perpendicular to the circuit board, and light emitted by the light-emitting unit enters the light guide member through a light incident surface of the groove, and the light is reflected by at least one of the first side surface and the second side surface, and the light leaves the light guide member through the light emergence surface.

In some embodiments, an axial direction perpendicular to the second side surface is a first axial direction, an axial direction perpendicular to the positioning surface is a second axial direction, the first axial direction is perpendicular to the second axial direction, a thickness of the light-emitting module in the second axial direction is less than or equal to 1.5 mm, and a distance from the light-emitting unit to the light emergence surface in the first axial direction is less than or equal to 6 mm.

Based on some embodiments, through combination of the light guide member, the reflective paint layer, and the light-absorbing paint layer, a distance by which a light path is projected onto the light emergence surface is increased after the light emitted by the light-emitting unit is turned and reflected, so that a required stack thickness of the light-emitting module is reduced, a required height of the light guide member is reduced, a distance for which light needs to be equalized between the light-emitting unit and the light emergence surface is reduced, and brightness and uniformity of the light-emitting module are improved. Based on some embodiments, the light-emitting module has advantages in a weight and a space.

BRIEF DESCRIPTION OF THE DRAWINGS

FIG. 7A is a schematic appearance diagram in a direction of an arrow K in FIG. 6A;

FIG. 7B is a schematic appearance diagram in a direction of an arrow K in FIG. 6B;

DETAILED DESCRIPTION

Figure 1:
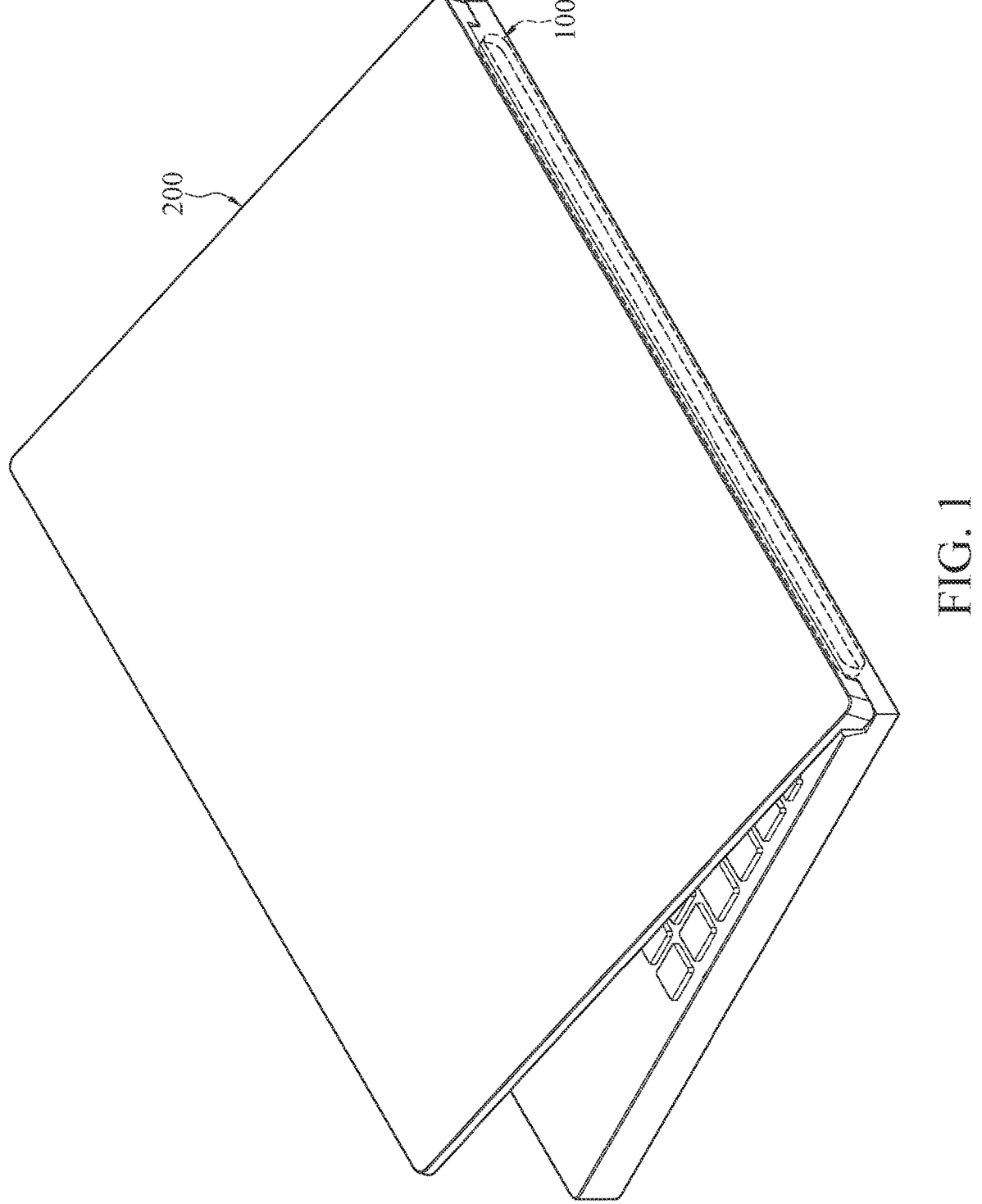
FIG. 1 is a schematic diagram of an appearance of an electronic product according to some embodiments.

According to some embodiments, a light-emitting module 100 is applicable to various electronic products, household appliances, automotive lights, tires, fans, or the like, to present a desirable special illuminant visual effect. According to some embodiments, the light-emitting module 100 is applicable to an electronic E-sports product 200 (shown in FIG. 1).

Figure 2A:
FIG. 2A is a three-dimensional schematic exploded view of a first embodiment of a light-emitting module.
Figure 2B:
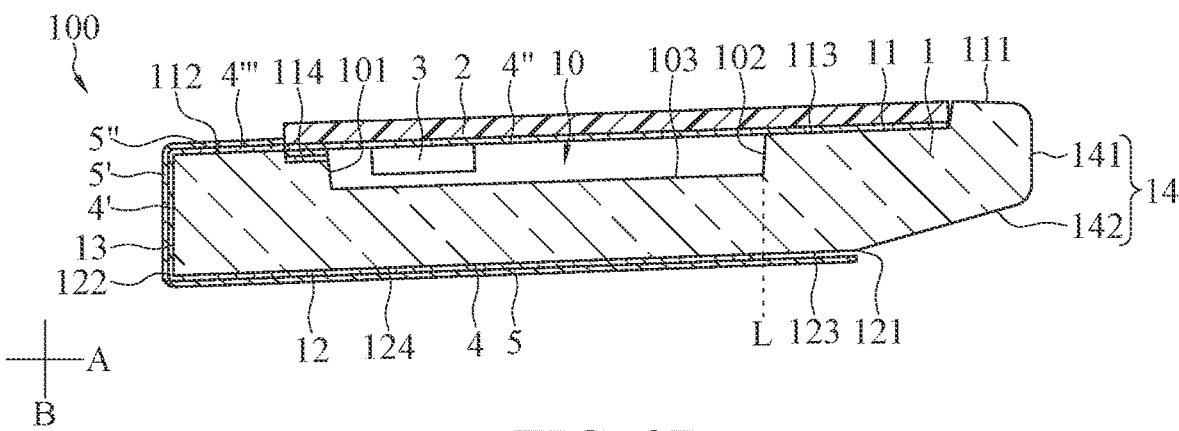
FIG. 2B is a schematic sectional view along a line 2B-2B marked in FIG. 2A, showing a state of a light guide member on which a circuit board, a first reflective paint layer, and a first light-absorbing paint layer are combined.

Referring to FIG. 2A and FIG. 2B, FIG. 2A is a three-dimensional schematic exploded view of a first embodiment of the light-emitting module 100, and FIG. 2B is a schematic sectional view along a line 2B-2B marked in FIG. 2A. The light-emitting module 100 includes a light guide member 1, a first reflective paint layer 4, a first light-absorbing paint layer 5, a circuit board 2, and a light-emitting unit 3. The light guide member 1 includes a positioning surface 11, a first side surface 12, a second side surface 13, and a light emergence surface 14. The positioning surface 11 includes a groove 10. The positioning surface 11 is connected to the second side surface 13 and the light emergence surface 14. The second side surface 13 is connected to the first side surface 12. The first side surface 12 is connected to the light emergence surface 14. The first reflective paint layer 4 is arranged on the first side surface 12. The first light-absorbing paint layer 5 is arranged on the first reflective paint layer 4. The circuit board 2 is located on the positioning surface 11. The light-emitting unit 3 is arranged on the circuit board 2 and is accommodated in the groove 10.

After the circuit board 2 is positioned through assistant of the positioning surface 11 and is combined with the light guide member 1, light emitted by the light-emitting unit 3 is turned and reflected at least through the first reflective paint layer 4, and is then projected onto the light emergence surface 14, which realizes a uniform optical effect through change of a light path. In addition, the circuit board 2 is attached to the light guide member 1, so that a required stack thickness of the light-emitting module 100 is reduced, a required height of the light guide member 1 is reduced, and brightness and uniformity of the light-emitting module 100 is improved. Moreover, the light-emitting module 100 has few components, and may be easily assembled, and has advantages in a weight and a space in assembled products.

Referring to FIG. 2A, in some embodiments, the light guide member 1 is an annular light guide structure, and has an annular appearance with a curvature. In some embodiments, the light guide member 1 may be polystyrene (PS), polycarbonate (PC), polymethyl methacrylate (PMMA), or another polymer material. In some embodiments, the light guide member 1 may be a polyester film (PET film). In some embodiments, the light guide member 1 may be glass. In some embodiments, an auxiliary material such as a diffusant, diffusion powder, and a toner may be added to the light guide member 1. In some embodiments, the circuit board 2 may be a flexible printed circuit (FPC). In some embodiments, the light-emitting unit 3 may be a light-emitting diode (LED).

Referring to FIG. 2A, in some embodiments, the first side surface 12 may further include a positioning groove or a positioning protrusion, to be firmly engaged with a product, but the present invention is not limited thereto.

Referring to FIG. 2B, in some embodiments, a surface of the circuit board 2 is coated with adhesive to be attached to the positioning surface 11. In some embodiments, the groove 10 is a narrow and long groove to accommodate the light-emitting unit 3 (referring to FIG. 2A).

Referring to FIG. 2B, in some embodiments, the light emergence surface 14 includes a vertical light emergence surface 141 and an oblique light emergence surface 142. The oblique light emergence surface 142 is connected to the vertical light emergence surface 141 and the first side surface 12. An included angle between the oblique light emergence surface 142 and the vertical light emergence surface 141 is an obtuse angle. An included angle between the oblique light emergence surface 142 and the first side surface 12 is an obtuse angle.

Referring to FIG. 2B, in some embodiments, two ends of the positioning surface 11 respectively close to the light emergence surface 14 and the second side surface 13 further respectively include a protruding rib 111 and a protruding rib 112. In other words, the circuit board 2 is located between the protruding rib 111 and the protruding rib 112 and is attached to the positioning surface 11. The circuit board 2 may be easily aligned and attached to the positioning surface 11 through the protruding rib 111 and the protruding rib 112 on the two sides.

Referring to FIG. 2B, in some embodiments, the positioning surfaces 11 on two sides of the groove 10 respectively include an outer positioning surface 113 close to the light emergence surface 14 and an inner positioning surface 114 close to the second side surface 13. The groove 10 includes an inner side surface 101 close to the second side surface 13, an outer side surface 102 close to the light emergence surface 14, and a light incident surface 103 connected to the inner side surface 101 and the outer side surface 102. A height of the inner side surface 101 is the same as a height of the outer side surface 102. In some embodiments, the circuit board 2 is located between the protruding rib 111 and the protruding rib 112 and is attached to the outer positioning surface 113 and the inner positioning surface 114.

Referring to FIG. 2B, in terms of the first side surface 12, structures of the light-emitting module 100 from an outer side toward an inner side are successively the first light-absorbing paint layer 5, the first reflective paint layer 4, and the first side surface 12. In some embodiments, the light-emitting module 100 further includes a second reflective paint layer 4' arranged on the second side surface 13 and a second light-absorbing paint layer 5' arranged on the second reflective paint layer 4'. The second reflective paint layer 4' is connected to the first reflective paint layer 4, and the second light-absorbing paint layer 5' is connected to the first light-absorbing paint layer 5. In other words, in terms of the second side surface 13, structures from an outer side toward an inner side are successively the second light-absorbing paint layer 5', the second reflective paint layer 4', and the second side surface 13. In some embodiments, the light-emitting module 100 further includes a third reflective paint layer 4" arranged on an inner side surface of the circuit board 2. In some embodiments, the light-emitting module 100 further includes a fourth reflective paint layer 4''' arranged on the positioning surface 11 and a third light-absorbing paint layer 5" arranged on the fourth reflective paint layer 4'''. The fourth reflective paint layer 4''' is connected to the second reflective paint layer 4', and the third light-absorbing paint layer 5" is connected to the second light-absorbing paint layer 5'. In other words, in terms of the positioning surface 11, structures from an outer side toward an inner side are successively the third light-absorbing paint layer 5", the fourth reflective paint layer 4''', and the positioning surface 11.

In some embodiments, the fourth reflective paint layer 4''' arranged on the positioning surface 11 and the third light-absorbing paint layer 5" arranged on the fourth reflective paint layer 4''' are respectively arranged on the inner positioning surface 114 and the protruding rib 112 of the positioning surface 11.

Through the reflective paint layers 4, 4', 4", and 4''', the light emitted by the light-emitting unit 3 may be turned, reflected, and projected onto the light emergence surface 14, instead of being directly projected onto the light emergence surface 14, so that a path distance by which the light is projected onto the light emergence surface 14 is increased, thereby reducing a substantial distance from the light-emitting unit 3 to the light emergence surface 14 and realizing a uniform visual effect. In some embodiments, a distance between the light-emitting unit 3 and the light emergence surface 14 is less than 6 millimeters (mm). In other words, if an axial direction perpendicular to the second side surface 13 is an axial direction A, a distance from the light-emitting unit 3 to the light emergence surface 14 in the axial direction A is less than or equal to 6 mm.

Through the light-absorbing paint layers 5, 5', and 5", the light-emitting module 100 may have a consistent appearance color with the product, which realizes invisibility and avoids light leakage. In order to satisfy an appearance requirement, the light-absorbing paint layers 5, 5', and 5" may be paint layers with various color. For example, for a product with a red appearance, the light-absorbing paint layers 5, 5', and 5" may be red paint layers, and for a product with a black appearance, the light-absorbing paint layers 5, 5', and 5" may be black paint layers, but the present invention is not limited thereto. Through combination of the reflective paint layers 4, 4', 4", and 4''' and the light-absorbing paint layers 5, 5', and 5", an appearance of the light-emitting module 100 may present an original color effect of the light-absorbing paint layers when the light-emitting unit 3 is not lit, and the light-emitting module 100 may present a uniform light effect when the light-emitting unit 3 is lit.

Moreover, through combination of the light guide member 1 and the reflective paint layers 4, 4', 4", and 4''' and the light-absorbing paint layers 5, 5', and 5", the required stack thickness of the light-emitting module 100 may be reduced, the required height of the light guide member 1 may be reduced, the brightness and uniformity of the light-emitting module 100 may be improved, and a utilization rate of light may be increased. In some embodiments, a mechanism thickness of the light-emitting module 100 is less than 1.5 mm. In other words, if an axial direction perpendicular to the positioning surface 11 is an axial direction B, a thickness of the light-emitting module 100 in the axial direction B is less than or equal to 1.5 mm.

Referring to FIG. 2B, in some embodiments, a thickness of the first reflective paint layer 4 is greater than a thickness of the first light-absorbing paint layer 5, a thickness of the second reflective paint layer 4' is greater than a thickness of the second light-absorbing paint layer 5', and a thickness of the fourth reflective paint layer 4''' is greater than a thickness of the third light-absorbing paint layer 5". In some embodiments, larger thicknesses of the reflective paint layers 4, 4', 4", and 4''' indicate a better reflection effect. In some embodiments, the thicknesses of the reflective paint layers 4, 4', 4", and 4''' are greater than 0.02 mm, and the thicknesses of the light-absorbing paint layers 5, 5', and 5" are greater than 0.02 mm.

Referring to FIG. 2B, in some embodiments, an area of the first reflective paint layer 4 is less than or equal to an area of the first light-absorbing paint layer 5.

Referring to FIG. 2B, in some embodiments, the first side surface 12 includes a first region 123 and a second region 124. A boundary between the first region 123 and the second region 124 is defined by a plumb line L on the first side surface 12. The plumb line L extends vertically from the outer side surface 102 toward the first side surface 12. The first region 123 is connected to the light emergence surface 14 and the second region 124, and the second region 124 is connected to the second side surface 13. The first reflective paint layer 4 is arranged on the second region 124, and the first light-absorbing paint layer 5 is arranged on the first region 123 and the second region 124. A length of the first region 123 is less than a length of the second region 124. Since the area of the first reflective paint layer 4 is less than the area of the first light-absorbing paint layer 5, light leakage may be avoided.

Figure 3:
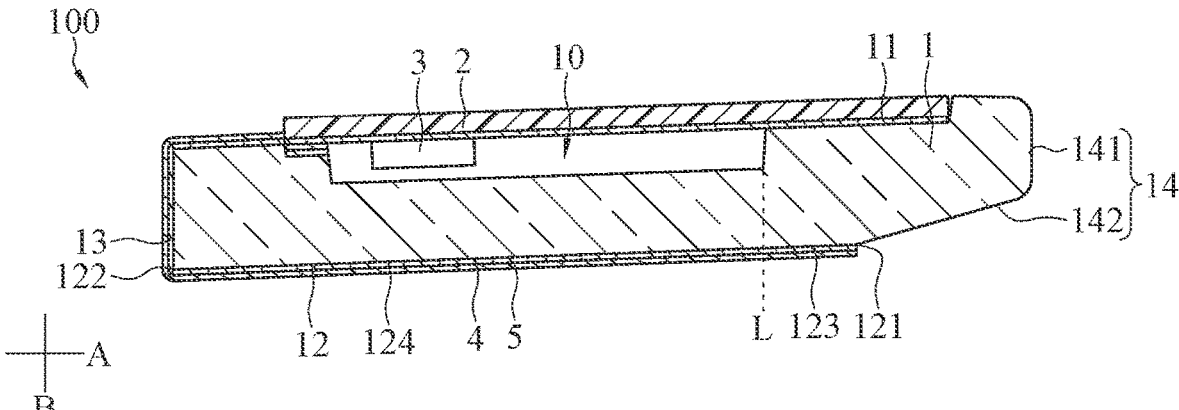
FIG. 3 is a schematic sectional view of a second embodiment of the light-emitting module.

Referring to FIG. 3, FIG. 3 is a schematic sectional view of a second embodiment of the light-emitting module 100. In some other embodiments, the area of the first reflective paint layer 4 is equal to the area of the first light-absorbing paint layer 5. The first reflective paint layer 4 is arranged on the first region 123 and the second region 124, and the first light-absorbing paint layer 5 is arranged on the first region 123 and the second region 124. In some embodiments, the first reflective paint layer 4 and the first light-absorbing paint layer 5 are uniformly arranged on all surfaces of the first side surface 12, and do not surpass a first end portion 121. Since the area of the first reflective paint layer 4 is equal to the area of the first light-absorbing paint layer 5, light leakage may be avoided, and a desirable appearance may be presented.

Referring to FIG. 2B, in some embodiments, two ends of the first side surface 12 respectively include the first end portion 121 and a second end portion 122. The first end portion 121 is connected to the light emergence surface 14, and the second end portion 122 is connected to the second side surface 13. A distance between the first end portion 121 and the positioning surface 11 is less than a distance between the second end portion 122 and the positioning surface 11. In other words, an included angle between the first side surface 12 and the second side surface 13, that is, the second end portion 122, is an acute angle.

Referring to FIG. 2B, in some embodiments, the included angle between the first side surface 12 and the second side surface 13, that is, the second end portion 122, may be a sharp corner or a round corner (not shown in the figure). When the second end portion 122 is the round corner, a curved structure is formed between the first reflective paint layer 4 and the second reflective paint layer 4', and a curved structure is formed between the first light-absorbing paint layer 5 and the second light-absorbing paint layer 5'.

Referring to FIG. 2B, in some embodiments, the axial direction perpendicular to the second side surface 13 is the axial direction A, the axial direction perpendicular to the positioning surface 11 is the axial direction B, and the axial direction A is perpendicular to the axial direction B. A width of the groove 10 in the axial direction A is greater than a width of the light-emitting unit 3 in the axial direction A, and a height of the groove 10 in the axial direction B is greater than a height of the light-emitting unit 3 in the axial direction B. Through the groove 10 of the light guide member 1, the light path may be changed, thereby realizing a uniform optical effect. Since the width and the height of the groove 10 are greater than the width and the height of the light-emitting unit 3, an air layer is further provided between the groove 10 and the light-emitting unit 3. Through a space of the air layer, the light emitted by the light-emitting unit 3 may generate a desirable light blending effect after reflected by the third reflective paint layer 4".

Referring to FIG. 2B, in some embodiments, a distance between the light-emitting unit 3 and the second side surface 13 in the axial direction A is less than a distance between the light-emitting unit 3 and the light emergence surface 14 in the axial direction A, and a distance between the groove 10 and the second side surface 13 in the axial direction A is less than a distance between the groove 10 and the light emergence surface 14 in the axial direction A. In some embodiments, a distance between the light-emitting unit 3 and the inner side surface 101 in the axial direction A is less than a distance between the light-emitting unit 3 and the outer side surface 102 in the axial direction A.

Referring to FIG. 2B, in some embodiments, in the axial direction A, a ratio of the distance between the light-emitting unit 3 and the second side surface 13 to the distance between the light-emitting unit 3 and the light emergence surface 14 is 1:2.

Referring to FIG. 2B, in some embodiments, a height of the inner side surface 101 is the same as a height of the outer side surface 102 in the axial direction B. The light incident surface 103 is parallel to the positioning surface 11.

Referring to FIG. 2B, in some embodiments, a projection length of the oblique light emergence surface 142 in the axial direction B is less than a projection length of the vertical light emergence surface 141 in the axial direction B.

Figure 4:
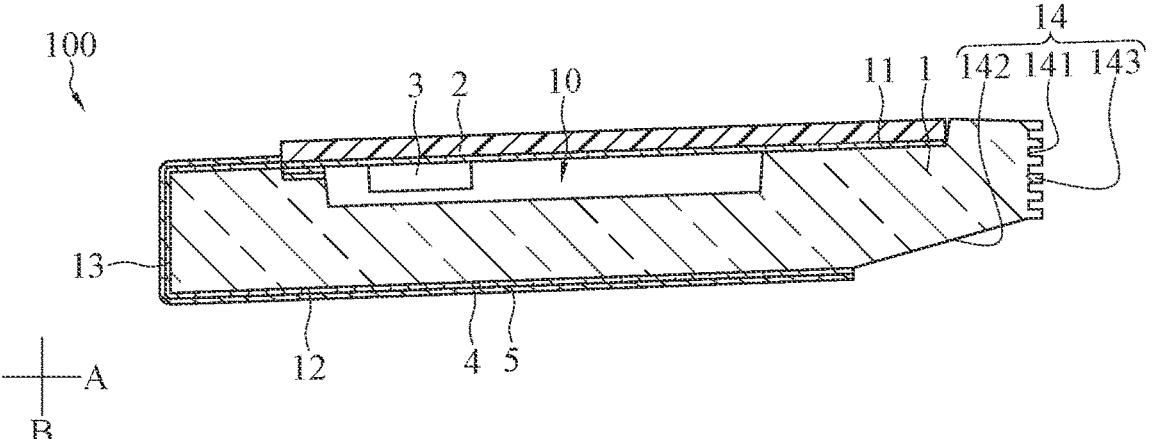
FIG. 4 is a schematic sectional view of a third embodiment of the light-emitting module.

Referring to FIG. 4, FIG. 4 is a schematic sectional view of a third embodiment of the light-emitting module 100. In some embodiments, the light guide member 1 further includes a microstructure 143, which is arranged on the light emergence surface 14 (for example, arranged on the vertical light emergence surface 141). Through the microstructure 143, the light uniformity of the light-emitting module 100 may be improved.

Figure 5:
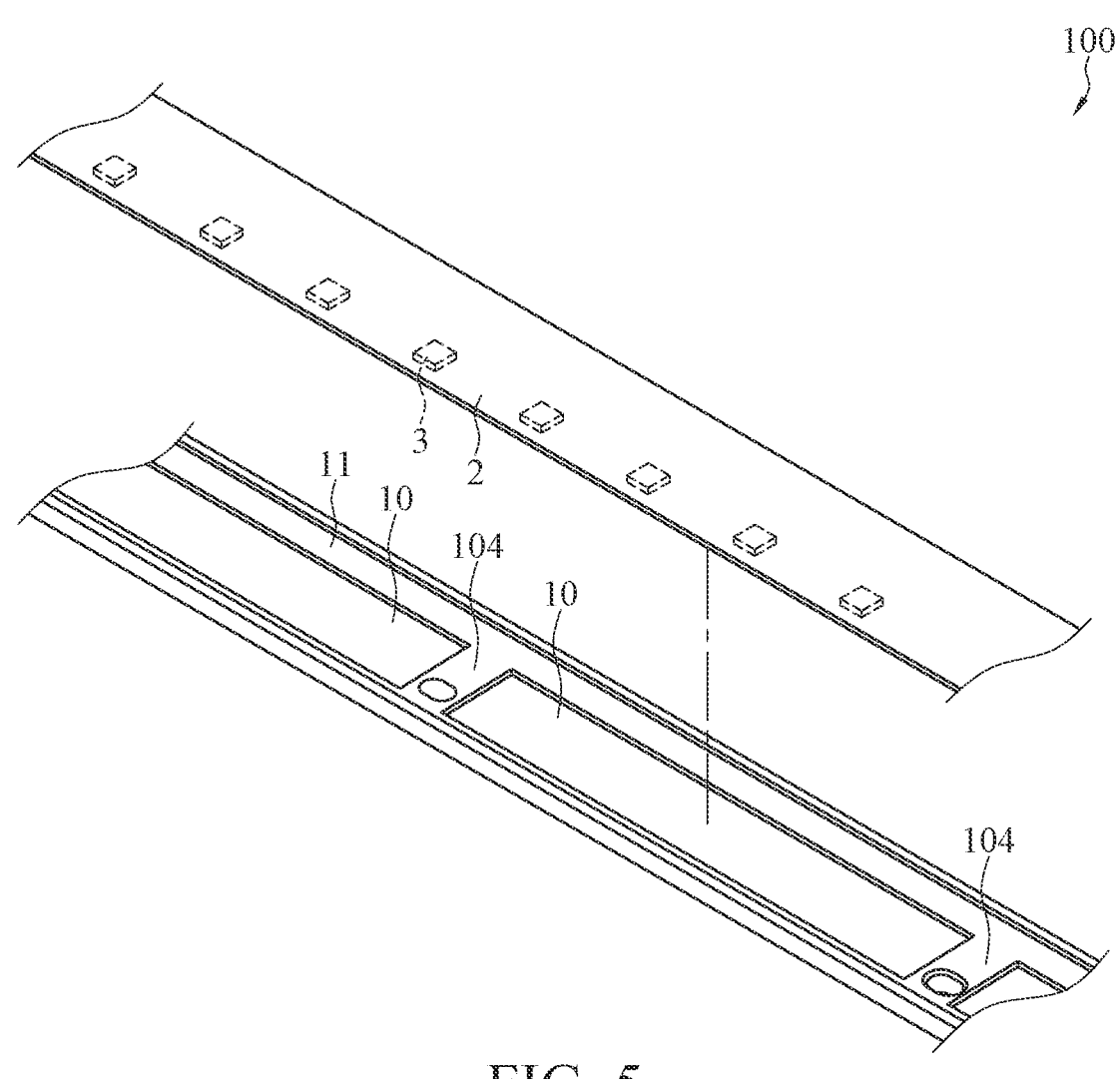
FIG. 5 is a partial three-dimensional schematic exploded view 1 of the first embodiment of the light-emitting module.

In some embodiments, the groove 10 may be a single groove or a plurality of grooves. Referring to FIG. 5, FIG. 5 is a partial three-dimensional schematic exploded view 1 of the first embodiment of the light-emitting module 100. In some embodiments, the positioning surface 11 includes a plurality of grooves 10 and at least one rib 104, the at least one rib 104 is located between the grooves 10, a surface of each of the at least one rib 104 is in the same plane as the positioning surface 11, and the circuit board 2 is located on the surface of the at least one rib 104 and the positioning surface 11. Through support of the at least one rib 104, the circuit board 2 and the light guide member 1 may be firmly attached to each other.

Referring to FIG. 5, in some embodiments, the rib 104 may further include a positioning hole or a positioning protrusion, but the present invention is not limited thereto.

Referring to FIG. 5, in some embodiments, the light-emitting module 100 includes a plurality of light-emitting units 3, and the light-emitting units 3 are equidistantly arranged on the circuit board 2. In some embodiments, distances between the light-emitting units 3 are in a range of 7.5 mm to 8.0 mm. In some other embodiments, in order to help the light-emitting module 100 present an expected light effect, the light-emitting units 3 are non-equidistantly arranged on the circuit board 2 (not shown in the figure). Through adjustment of a quantity and distribution positions of the light-emitting units 3, a uniform light effect may be presented. In some embodiments, the light-emitting module 100 may present a flowing and uniform light effect.

Referring to FIG. 6A to FIG. 7B, in some embodiments, the circuit board 2 is a flexible printed circuit (FPC). Through direct attachment of the FPC to the positioning surface 11 of the light guide member 1, an overall mechanism thickness of the light-emitting module 100 may be reduced to be less than 1.5 mm, which increases a usable design space of a product.

Figure 6A:
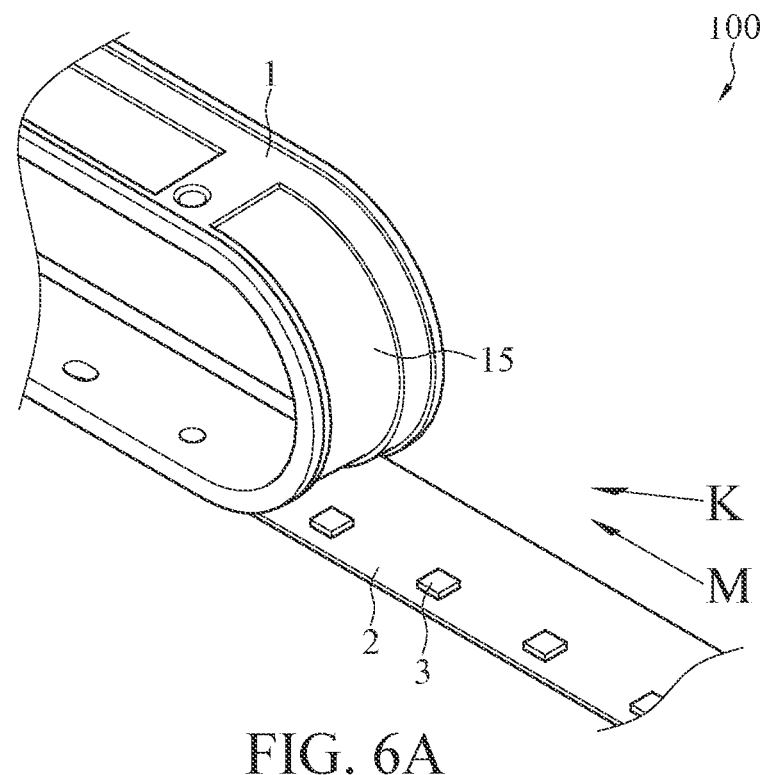
FIG. 6A is a partial three-dimensional schematic exploded view 2 of the first embodiment of the light-emitting module.
Figure 6B:
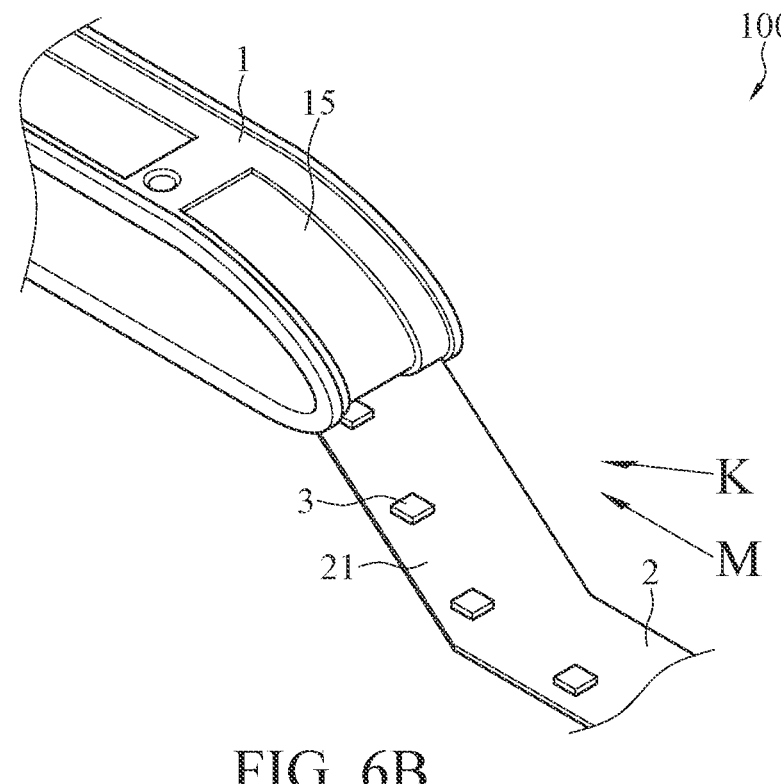
FIG. 6B is a partial three-dimensional schematic exploded view of a fourth embodiment of the light-emitting module.
Figure 8A:
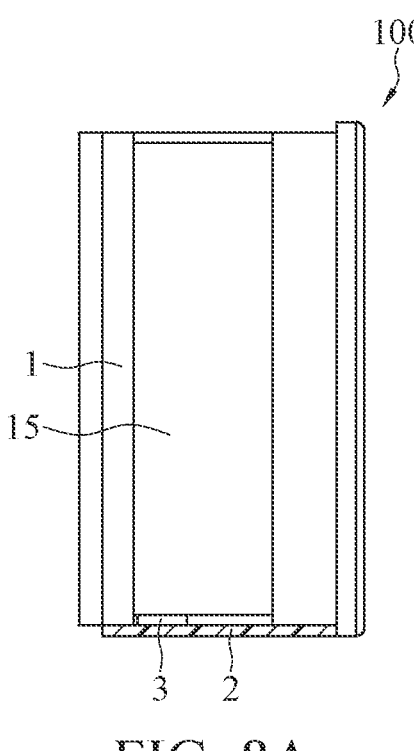
FIG. 8A is a schematic appearance diagram in a direction of an arrow M in FIG. 6A.
Figure 8B:
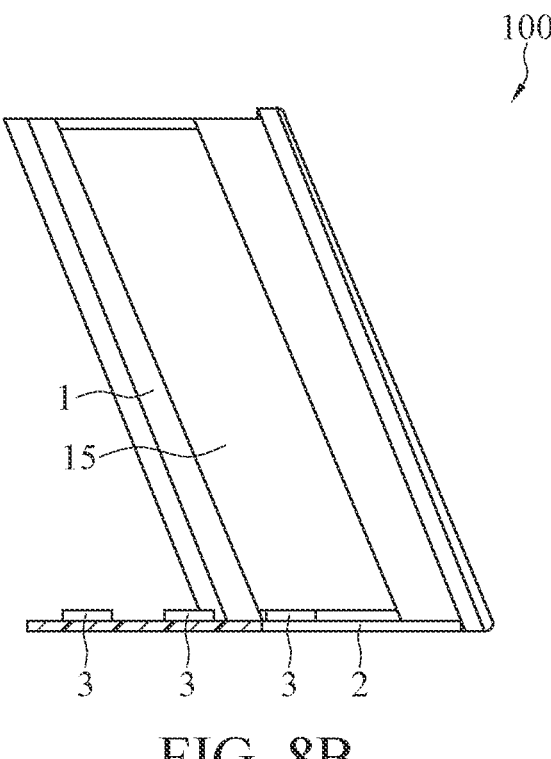
FIG. 8B is a schematic appearance diagram in a direction of an arrow M in FIG. 6B.

Referring to FIG. 6A to FIG. 7B and FIG. 2A together, in some embodiments, the light guide member 1 is an annular light guide structure, and a side edge of the light guide member 1 has a curved section 15. The curved section 15 is configured to connect an upper part of the light guide member 1 to a lower part of the light guide member 1. FIG. 7A and FIG. 7B are views in a direction of an arrow K shown in FIG. 6A and FIG. 6B, and FIG. 8A and FIG. 8B are views in a direction of an arrow M shown in FIG. 6A and FIG. 6B. Referring to FIG. 6A, FIG. 7A, and FIG. 8A, in some embodiments, projection positions of the upper part and the lower part of the light guide member 1 in the axial direction A are the same. The light guide member 1 is a rectangle (or an orthogon) with four corners being right angles when viewed in the direction of the arrow M. In this case, in order to fit the curved section 15 of the light guide member 1, the circuit board 2 is a strip-type circuit board. Referring to FIG. 6B, FIG. 7B, and FIG. 8B, in some embodiments, the projection positions of the upper part and the lower part of the light guide member 1 in the axial direction A are different. The light guide member 1 is a parallelogram with a pair of obtuse angles and a pair of acute angles when viewed in the direction of the arrow M. In this case, in order to fit the curved section 15 of the light guide member 1, the circuit board 2 is a bent strip-type circuit board. When the circuit board 2 is the bent strip-type circuit board, a part of the circuit board 2 attached to the curved section 15 further includes a curved circuit board section 21. Through the bent strip-type circuit board, the circuit board 2 may be snugly attached to the light guide member 1, which avoids light leakage. Moreover, through the different shapes of the light guide member 1, fitting with different product appearances is realized. For example, for a product appearance of an oblique plane, the oblique light guide member 1 shown in FIG. 6B and FIG. 7B is arranged for fitting.

In some embodiments, the light-emitting module 100 may be bent or circled.

In order to further describe a relationship between the distance between the first end portion 121 and the positioning surface 11 and the distance between the second end portion 122 and the positioning surface 11, referring to FIG.

Figures 9A, 9B:
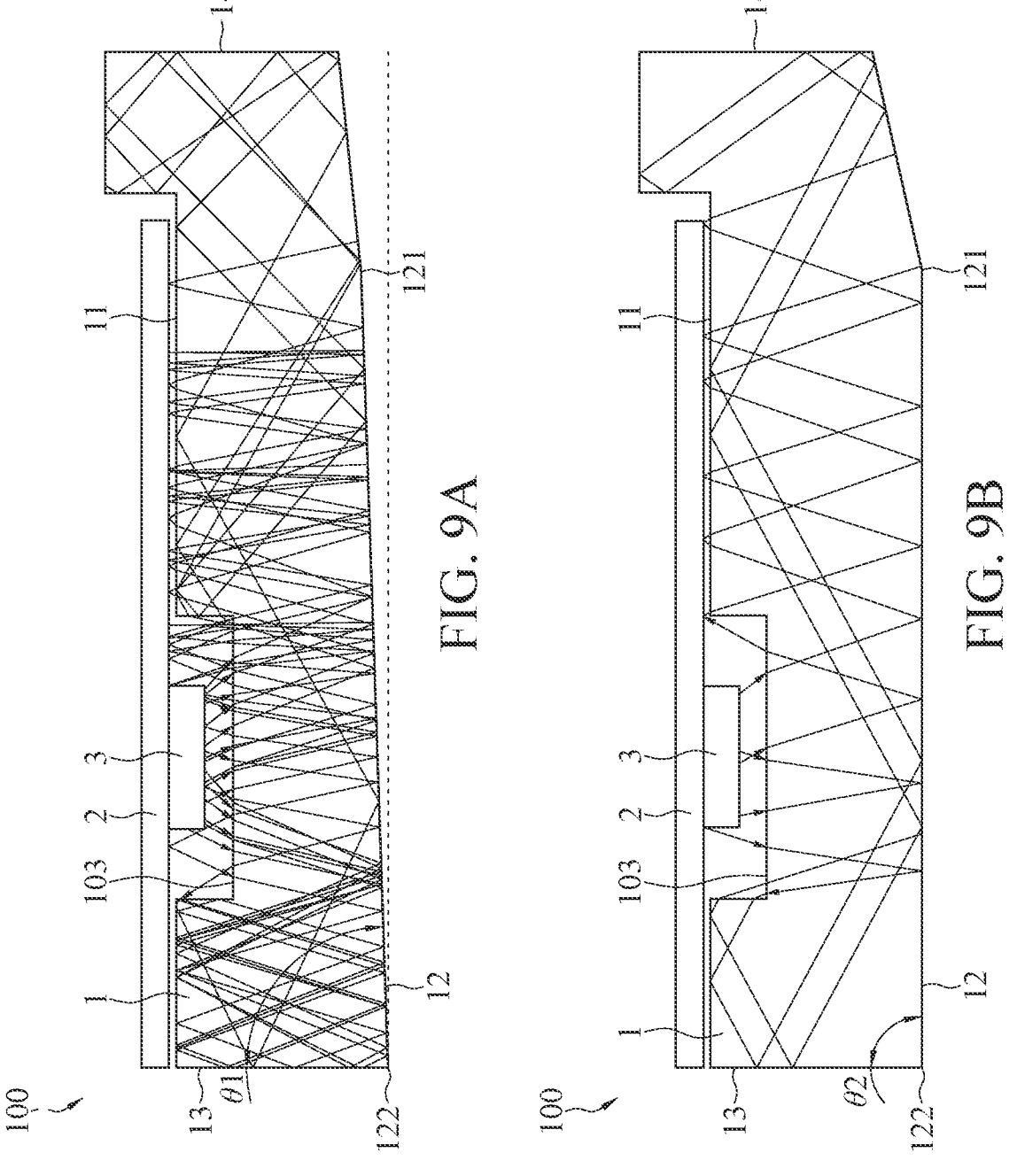
FIG. 9A is a schematic diagram of light effect simulation of a fifth embodiment of the light-emitting module.
FIG. 9B is a schematic diagram of light effect simulation of a sixth embodiment of the light-emitting module.
Figure 9C:
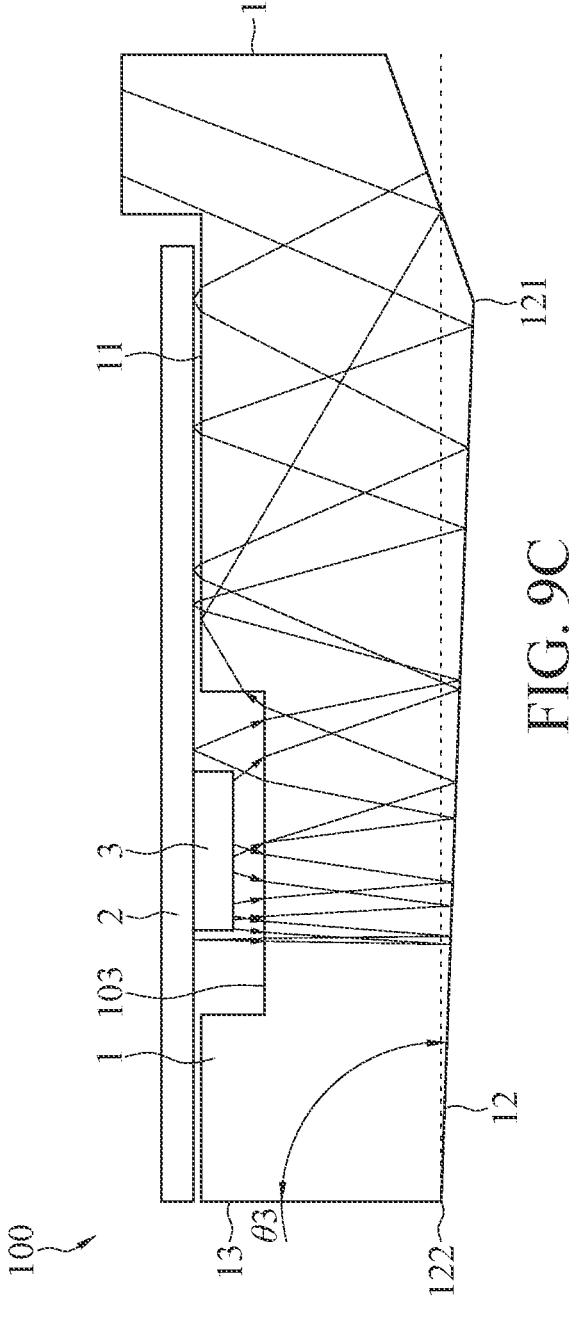
FIG. 9C is a schematic diagram of light effect simulation of a seventh embodiment of the light-emitting module.

9A to FIG. 9C, solid thin lines and arrows drawn in the figures are light paths of light, and a dashed line is an auxiliary horizontal line.

Referring to FIG. 9A, in some embodiments, when an included angle $\Theta 1$ between the first side surface 12 and the second side surface 13 is 88 degrees (that is, an included angle between the first side surface 12 and the auxiliary horizontal line is +2 degrees), it may be clearly seen from FIG. 9A that the light entering the light guide member 1 through the light incident surface 103 has many reflection and refraction light paths. Compared with light in FIG. 9B and FIG. 9C, the light in FIG. 9A has more reflection and refraction light paths, so that the light leaves the light emergence surface 14 through more light paths. Therefore, the light emergence surface 14 presents a relatively desirable illuminous effect.

Referring to FIG. 9B, in some embodiments, when an included angle $\Theta 2$ between the first side surface 12 and the second side surface 13 is 90 degrees, that is, when the first side surface 12 and the second side surface 13 are perpendicular to each other (that is, an included angle between the first side surface 12 and the auxiliary horizontal line is 0 degrees), it may be clearly seen from FIG. 9B that the light entering the light guide member 1 through the light incident surface 103 has a little more reflection and refraction light paths. Compared with the light in FIG. 9A, the light in FIG. 9B has fewer reflection and refraction light paths. However, compared with the light in FIG. 9C, the light in FIG. 9B has more reflection and refraction light paths, so that the light leaves the light emergence surface 14 through more light paths. Therefore, the light emergence surface 14 presents a relatively good illuminous effect.

Referring to FIG. 9C, in some embodiments, when an included angle $\Theta 3$ between the first side surface 12 and the second side surface 13 is 92 degrees (that is, the included angle between the first side surface 12 and the auxiliary horizontal line is −2 degrees), it may be clearly seen from FIG. 9C that the light entering the light guide member 1 through the light incident surface 103 has few reflection and refraction light paths. Compared with the light in FIG. 9A and FIG. 9B, the light in FIG. 9C has fewer reflection and refraction light paths, so that the light leaves the light emergence surface 14 through fewer light paths. Therefore, the light emergence surface 14 presents a relatively poor illuminous effect.

In other words, in some embodiments, when the distance between the first end portion 121 and the positioning surface 11 is less than the distance between the second end portion 122 and the positioning surface 11, the light effect may be improved, and brightness of the light-emitting module 100 may be increased. The auxiliary horizontal line is a horizontal line using the positioning surface 11 as a reference.

In order to further describe a relationship between different distances between the light-emitting unit 3 and the outer side surface 102 in the axial direction A, referring to FIG. 10A to FIG. 10D, solid thin lines and arrows shown in the figures show light paths of light.

Figures 10A, 10B:
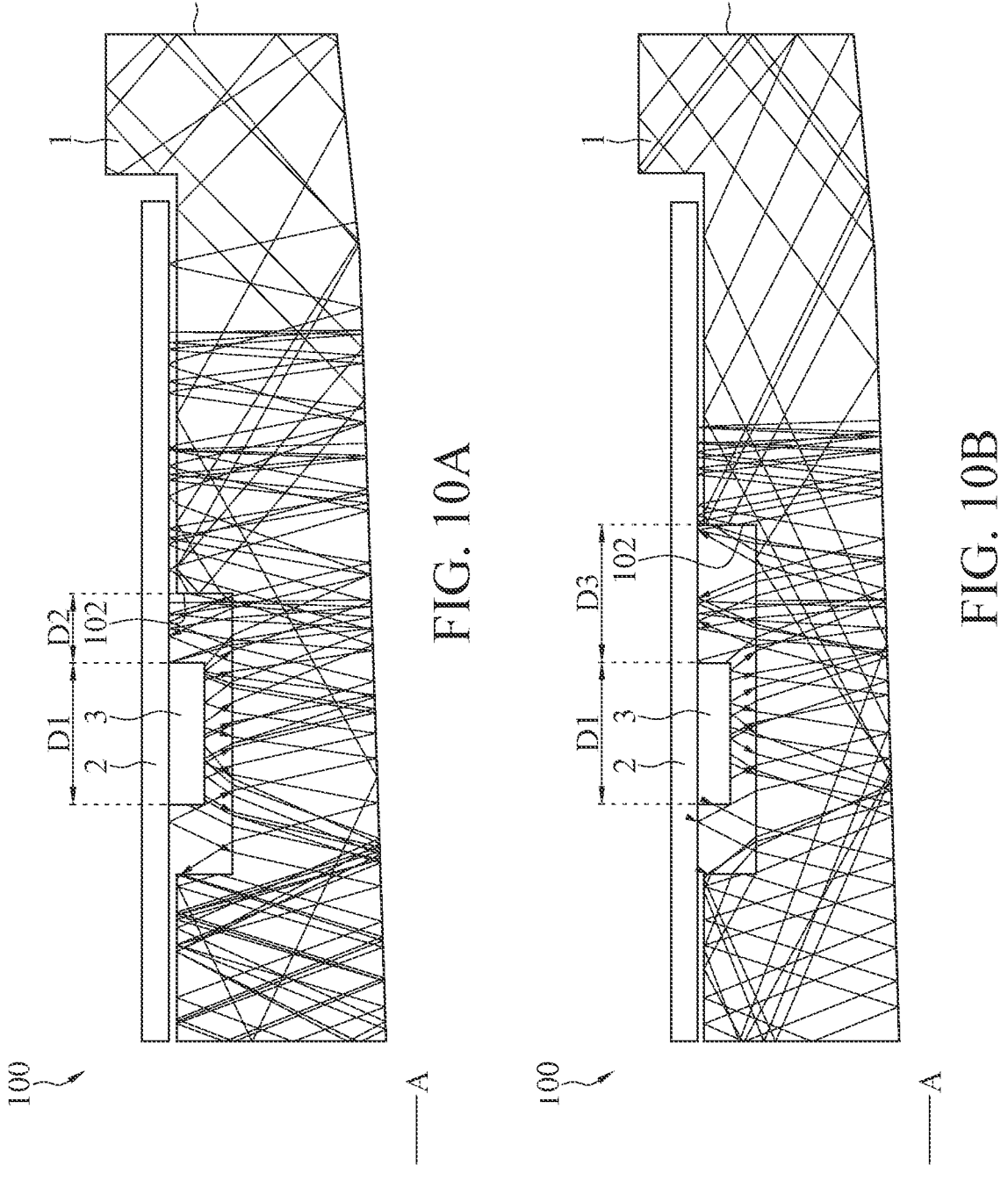
FIG. 10A is a schematic diagram of light effect simulation of an eighth embodiment of the light-emitting module.
FIG. 10B is a schematic diagram of light effect simulation of a ninth embodiment of the light-emitting module.

In FIG. 10A, in some embodiments, a distance D2 between the light-emitting unit 3 and the outer side surface 102 in the axial direction A is 0.5 times a width D1 of the light-emitting unit 3 in the axial direction A (that is, D2=0.5× D1).

In FIG. 10B, in some embodiments, a distance D3 between the light-emitting unit 3 and the outer side surface 102 in the axial direction A is 1 time the width D1 of the light-emitting unit 3 in the axial direction A (that is, D3=1× D1).

Figures 10C, 10D:
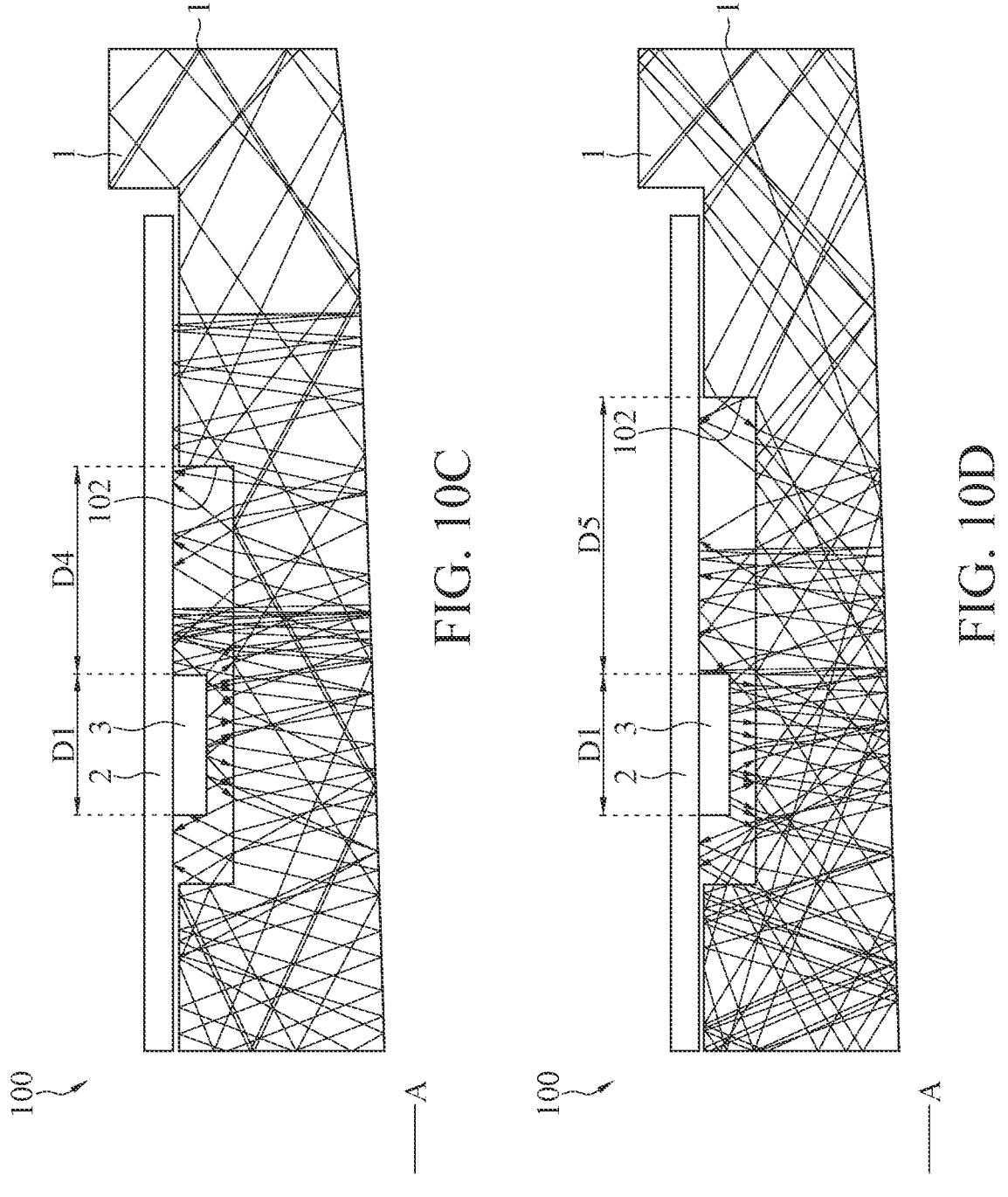
FIG. 10C is a schematic diagram of light effect simulation of a tenth embodiment of the light-emitting module.
FIG. 10D is a schematic diagram of light effect simulation of an eleventh embodiment of the light-emitting module.

In FIG. 10C, in some embodiments, a distance D4 between the light-emitting unit 3 and the outer side surface 102 in the axial direction A is 1.5 times the width D1 of the light-emitting unit 3 in the axial direction A (that is, D4=1.5× D1).

In FIG. 10D, in some embodiments, a distance D5 between the light-emitting unit 3 and the outer side surface 102 in the axial direction A is 2 times the width D1 of the light-emitting unit 3 in the axial direction A (that is, D5=2× D1).

In some embodiments, simulated analysis shows that a larger distance between the light-emitting unit 3 and the outer side surface 102 in the axial direction A indicates a better light effect, which increases the brightness of the light-emitting module 100. When the distance between the light-emitting unit 3 and the outer side surface 102 in the axial direction A is 1.5 times to 2 times the width of the light-emitting unit 3 in the axial direction A, a relatively desirable light effect is realized. Referring to FIG. 10A to FIG. 10D, in terms of excellence of the light effect, FIG. 10D>FIG. 10C>FIG. 10B>FIG. 10A. A ratio of the distance between the light-emitting unit 3 and the outer side surface 102 in the axial direction A to the width of the light-emitting unit 3 in the axial direction A has a linkage relationship with the light effect.

In some embodiments, the circuit board 2 is an FPC, and is an opaque FPC. The opaque FPC is naturally opaque or is provided with a light-absorbing paint layer on an outer surface of the circuit board 2 (not shown in the figure). In some embodiments, structures from an outer side toward an inner side are successively the light-absorbing paint layer on the outer surface of the circuit board 2, the circuit board 2, and the third reflective paint layer 4″ on the inner surface of the circuit board 2.

Referring to FIG. 2B, in some embodiments, a light emergence direction of the light-emitting unit 3 is perpendicular to the circuit board 2, and the light emitted by the light-emitting unit 3 enters the light guide member 1 through a light incident surface 103 of the groove 10, and is reflected by at least one of the first side surface 12 and the second side surface 13, and leaves the light guide member 1 through the light emergence surface 14. In some embodiments, the light-emitting unit 3 emits light from a single side. The light-emitting surface is a surface of the light-emitting unit 3 opposite to the first side surface 12.

Based on some embodiments, through combination of the light guide member, the reflective paint layer, and the light-absorbing paint layer, a distance by which a light path is projected onto the light emergence surface is increased after the light emitted by the light-emitting unit is turned and reflected, so that the required stack thickness of the light-emitting module is reduced, the required height of the light guide member is reduced, a distance for which light needs to be equalized between the light-emitting unit and the light emergence surface is reduced, and the brightness and uniformity of the light-emitting module are improved. Based on some embodiments, the light-emitting module has advantages in a weight and a space.

What is claimed is:

1. A light-emitting module, comprising:
a light guide member, comprising a positioning surface, a first side surface, a second side surface, and a light emergence surface, wherein the positioning surface comprises a groove, the positioning surface is connected to the second side surface and the light emergence surface, the second side surface is connected to the first side surface, and the first side surface is connected to the light emergence surface;
a first reflective paint layer, arranged on the first side surface;
a first light-absorbing paint layer, arranged on the first reflective paint layer;
a circuit board, located on the positioning surface; and
a light-emitting unit, arranged on the circuit board and accommodated in the groove.

2. The light-emitting module according to claim 1, further comprising:
a second reflective paint layer, arranged on the second side surface; and
a second light-absorbing paint layer, arranged on the second reflective paint layer.

3. The light-emitting module according to claim 1, further comprising a third reflective paint layer arranged on an inner side surface of the circuit board.

4. The light-emitting module according to claim 1, further comprising:
a fourth reflective paint layer, arranged on the positioning surface; and
a third light-absorbing paint layer, arranged on the fourth reflective paint layer.

5. The light-emitting module according to claim 1, wherein two ends of the first side surface respectively comprise a first end portion and a second end portion, the first end portion is connected to the light emergence surface, the second end portion is connected to the second side surface, and a distance between the first end portion and the positioning surface is less than a distance between the second end portion and the positioning surface.

6. The light-emitting module according to claim 1, wherein an included angle between the first side surface and the second side surface is in a range of 88 degrees to 90 degrees.

7. The light-emitting module according to claim 1, wherein an axial direction perpendicular to the second side surface is a first axial direction, and a width of the groove in the first axial direction is greater than a width of the light-emitting unit in the first axial direction.

8. The light-emitting module according to claim 1, wherein the groove comprises:
an inner side surface, close to the second side surface;
an outer side surface, close to the light emergence surface; and
a light incident surface, connected to the inner side surface and the outer side surface, wherein
an axial direction perpendicular to the second side surface is a first axial direction, and a distance between the light-emitting unit and the outer side surface in the first axial direction is 1.5 to 2 times a width of the light-emitting unit in the first axial direction.

9. The light-emitting module according to claim 1, wherein an axial direction perpendicular to the positioning surface is a second axial direction, and a height of the groove in the second axial direction is greater than a height of the light-emitting unit in the second axial direction.

10. The light-emitting module according to claim 1, wherein an axial direction perpendicular to the second side surface is a first axial direction, a distance between the light-emitting unit and the second side surface in the first axial direction is less than a distance between the light-emitting unit and the light emergence surface in the first axial direction, and a distance between the groove and the second side surface in the first axial direction is less than a distance between the groove and the light emergence surface in the first axial direction.

11. The light-emitting module according to claim 1, comprising a plurality of light-emitting units, wherein the light-emitting units are equidistantly arranged on the circuit board.

12. The light-emitting module according to claim 1, wherein the positioning surface comprises a plurality of grooves and at least one rib, the at least one rib is located between the grooves, a surface of each of the at least one rib is in the same plane as the positioning surface, and the circuit board is located on the surface of the at least one rib.

13. The light-emitting module according to claim 1, wherein two ends of the positioning surface respectively close to the light emergence surface and the second side surface each further comprise a protruding rib.

14. The light-emitting module according to claim 1, wherein an area of the first reflective paint layer is less than or equal to an area of the first light-absorbing paint layer.

15. The light-emitting module according to claim 1, wherein the first side surface comprises a first region and a second region, the first region is connected to the light emergence surface and the second region, the second region is connected to the second side surface, the first reflective paint layer is arranged on the second region, and the first light-absorbing paint layer is arranged on the first region and the second region.

16. The light-emitting module according to claim 1, wherein the light emergence surface comprises a vertical light emergence surface and an oblique light emergence surface, the oblique light emergence surface is connected to the vertical light emergence surface and the first side surface, an included angle between the oblique light emergence surface and the vertical light emergence surface is an obtuse angle, and an included angle between the oblique light emergence surface and the first side surface is an obtuse angle.

17. The light-emitting module according to claim 16, wherein an axial direction perpendicular to the positioning surface is a second axial direction, and a projection length of the oblique light emergence surface in the second axial direction is less than a projection length of the vertical light emergence surface in the second axial direction.

18. The light-emitting module according to claim 1, wherein the light guide member further comprises a micro-structure arranged on the light emergence surface.

19. The light-emitting module according to claim 1, wherein the light guide member is an annular light guide structure, and a side edge of the light guide member has a curved section.

20. The light-emitting module according to claim 1, wherein a light emergence direction of the light-emitting unit is perpendicular to the circuit board, and light emitted by the light-emitting unit enters the light guide member through a light incident surface of the groove, and the light is reflected by at least one of the first side surface and the second side surface, and the light leaves the light guide member through the light emergence surface.

21. The light-emitting module according to claim 1, wherein an axial direction perpendicular to the second side surface is a first axial direction, an axial direction perpendicular to the positioning surface is a second axial direction, the first axial direction is perpendicular to the second axial direction, a thickness of the light-emitting module in the second axial direction is less than or equal to 1.5 millimeters (mm), and a distance from the light-emitting unit to the light emergence surface in the first axial direction is less than or equal to 6 mm.

* * * * *